(12) United States Patent　　(10) Patent No.: US 8,610,945 B2
Nakamura　　(45) Date of Patent: Dec. 17, 2013

(54) IMAGE FORMING APPARATUS AND IMAGE FORMING METHOD HAVING A PIXEL CLOCK GENERATOR TO SWITCH AN IMAGE SIGNAL SENT TO A LASER BEAM MODULATOR

(75) Inventor: Yasuyuki Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 13/352,936

(22) Filed: Jan. 18, 2012

(65) Prior Publication Data

US 2012/0194827 A1　Aug. 2, 2012

(30) Foreign Application Priority Data

Jan. 28, 2011　(JP) .................................. 2011-016293

(51) Int. Cl.
*G06F 15/00*　(2006.01)
*H04N 1/40*　(2006.01)

(52) U.S. Cl.
USPC ........................................... 358/1.2; 358/471

(58) Field of Classification Search
USPC ......... 358/1.2, 1.13–1.18, 471; 347/249–250; 345/213; 455/260, 313
See application file for complete search history.

(56) References Cited

U.S. PATENT DOCUMENTS

| 6,265,916 | B1 * | 7/2001 | Ono et al. ...................... 327/116 |
| 7,193,643 | B2 * | 3/2007 | Zomorrodi et al. ........... 347/249 |
| 7,586,511 | B2 * | 9/2009 | Seki et al. ...................... 347/249 |
| 2002/0167680 | A1 * | 11/2002 | Sakurai .......................... 358/1.9 |
| 2011/0006818 | A1 * | 1/2011 | Takagi et al. .................. 327/147 |
| 2011/0164273 | A1 * | 7/2011 | Masui .......................... 358/1.14 |

FOREIGN PATENT DOCUMENTS

JP　　2004-237623　A　　8/2004

* cited by examiner

*Primary Examiner* — Gabriel Garcia
(74) *Attorney, Agent, or Firm* — Carter, DeLuca, Farrell & Schmidt LLP

(57) ABSTRACT

An image forming apparatus multiplies a first clock to drive the apparatus, thereby forming a second clock, and holds (1) a frequency of a third clock used by a print unit of the apparatus, (2) a magnification setting of the multiplying, (3) a resolution of the print unit, and (4) a micro zoom ratio. The apparatus sets a magnification of the multiplying based on the held values, discriminates whether a pixel is a target pixel to which a micro zoom is executed by using the held micro zoom ratio, and switches a count comparison value of the second clock formed by the multiplying based on the discrimination, thereby forming the third clock. The apparatus then forms a pixel segment based on image data of the target pixel corresponding to the discrimination and inserts the formed pixel segment based on a period of the third clock.

14 Claims, 12 Drawing Sheets

| INPUT VALUE | OUTPUT VALUE |
|---|---|
| b'0000 | X'0000 |
| b'0001 | X'0001 |
| b'0010 | X'0003 |
| b'0011 | X'0007 |
| b'0100 | X'000F |
| b'0101 | X'001F |
| b'0110 | X'003F |
| b'0111 | X'007F |
| b'1000 | X'00FF |
| b'1001 | X'01FF |
| b'1010 | X'03FF |
| b'1011 | X'07FF |
| b'1100 | X'0FFF |
| b'1101 | X'1FFF |
| b'1110 | X'3FFF |
| b'1111 | X'FFFF |

| PIXEL POSITION IN THE MAIN SCANNING DIRECTION | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| OUTPUT OF ADDING UNIT 202 | 0 | 3 | 6 | 9 | 12 | 1 | 4 | 7 | 10 | 13 | 2 | 5 | 8 | 11 |
| PIXEL-SEGMENT INSERTION TARGET | ○ | × | × | × | × | ○ | × | × | × | × | ○ | × | × | × |

IMAGE FORMING APPARATUS AND IMAGE FORMING METHOD HAVING A PIXEL CLOCK GENERATOR TO SWITCH AN IMAGE SIGNAL SENT TO A LASER BEAM MODULATOR

BACKGROUND OF THE INVENTION

1. Field of the Invention

The present invention relates to an image forming apparatus having a pixel clock generator for generating a pixel clock to switch, on a pixel unit basis, an image signal which is sent to a laser beam modulator and to an image forming method which is executed in such an apparatus.

2. Description of the Related Art

In an electrophotographic system for exposing an image by a laser beam, a method whereby the laser beam is irradiated to a rotary polygon mirror (polygon mirror) and deflected and the surface of a photosensitive material is exposed by the deflected reflection light has been used. As a photosensitive material, it is desirable to use a photosensitive material having a shape which is away from a laser beam light source at an equal distance, that is, an arc shape from a reflecting surface of the polygon mirror. However, in many image forming apparatuses, a cylindrical photosensitive material is used in order to form an image after exposure.

By using the cylindrical photosensitive material, lengths of optical paths from the respective light sources to the photosensitive material differ and a difference occurs in a main scanning magnification by the laser beam. As a method of correcting the difference of the main scanning magnification, there is a construction in which an optical device such as an fθ lens or the like is provided between the light source and the photosensitive material. However, high precision is required for the correction by the optical device. Therefore, in many image forming apparatuses, the high-precision correction of the optical device is not performed but a main scanning length is divided into a plurality of areas and the magnification in the main scanning direction is adjusted by inserting or extracting a micro pixel (hereinbelow, referred to as a "pixel segment") on a division area unit basis.

A clock frequency showing the pixel segment is obtained by a method whereby a clock to transfer image data of one pixel is multiplied by a value corresponding to desired resolution. That is, assuming that the resolution is equal to 16, the clock frequency showing the pixel segment is set to a frequency which is 16 times as high as the clock frequency for transferring one pixel. If the resolution is equal to 32, the clock frequency is set to a frequency which is 32 times as high as the clock frequency for transferring one pixel.

In many cases, each of the pixel clock frequency and the clock frequency of the pixel segment differs every print unit (engine) of the electrophotographic system. That is, each of the pixel clock frequency and the pixel segment clock frequency differs every image forming apparatus of the electrophotographic system. Japanese Patent Application Laid-Open No. 2004-237623 discloses such a mechanism that a reference clock frequency is set from the pixel clock frequency of the print unit of the electrophotographic system and the reference clock is multiplied to the clock frequency of a high frequency by a PLL (Phase Locked Loop). It is also disclosed that the apparatus uses a construction in which on the basis of a multiplication clock serving as a clock frequency of the pixel segment, three kinds of pixel clocks for controlling a micro zoom ratio in the main scanning direction are formed and selectively output to the print unit of the electrophotographic system. The three kinds of pixel clocks are a reference clock frequency to transfer one pixel, a clock frequency in which a unit time of the reference clock frequency is extended by a time corresponding to one pixel segment, and a clock frequency in which the unit time of the reference clock frequency is shortened by the time corresponding to one pixel segment. It is also disclosed that in the magnification control of every area of the main scanning length, a plurality of selection signals of time-sequential distribution for selecting the three kinds of pixel clocks are held and by synthesizing the time-sequential distribution selection signals, a selection output signal of the pixel clocks is formed.

However, in a pixel clock generator or the image forming apparatus according to Japanese Patent Application Laid-Open No. 2004-237623, as selection signals which are used to select the pixel clocks which are output to the print unit of the electrophotographic system, it is necessary to hold the selection signals of the number as many as the pixels in the main scanning direction. A construction of a memory for holding the selection signals or a holding unit corresponding to such a memory causes a circuit scale to be increased and becomes a factor of an increase in costs. Since the three kinds of pixel clocks are always formed, there is a possibility of an increase in radiation noise level of the image forming apparatus. Further, since the frequency of the reference clock which is used to form the pixel clock conforms with the print unit of the electrophotographic system constructing the image forming apparatus, there is a possibility that it differs from the clock frequency to control an image processing unit for processing the image data and serving as a transferring source. In such a case, at least two kinds of oscillators are necessary to construct the image forming apparatus and it becomes a factor of an increase in costs.

SUMMARY OF THE INVENTION

In order to solve the problems discussed above, the present invention provides an image forming apparatus comprising: a multiplying unit configured to multiply a first clock to drive the image forming apparatus, thereby forming a second clock; a first holding unit configured to hold a frequency of a third clock used by a print unit in the image forming apparatus; a second holding unit configured to hold a magnification setting of the multiplying unit; a third holding unit configured to hold a resolution to which the print unit corresponds; a fourth holding unit configured to hold a micro zoom ratio; a multiplication ratio control unit configured to set a magnification of the multiplying unit on the basis of the values held in the first to fourth holding units; a discriminating unit configured to discriminate whether or not a pixel is a target pixel to which a micro zoom is executed by using the value held in the fourth holding unit; a forming unit configured to switch a count comparison value of the second clock formed by the multiplying unit in accordance with a discrimination result of the discriminating unit, thereby forming the third clock; and a unit configured to form a pixel segment on the basis of image data of the target pixel corresponding to the discrimination result of the discriminating unit and insert the formed pixel segment in accordance with a period of the third clock.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
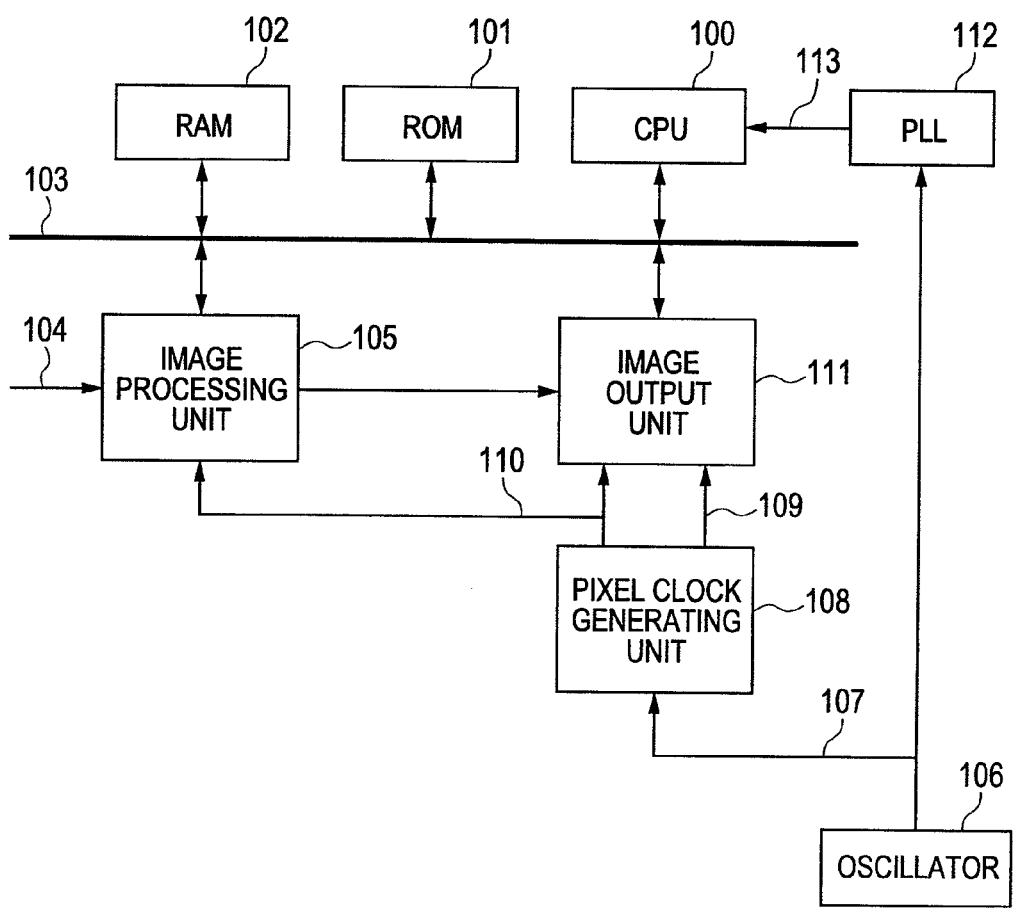
FIG. 1 is a constructional diagram of an image forming apparatus of the invention.

FIG. 1 is a diagram illustrating a construction of an image forming apparatus of the invention. In the diagram, a CPU (Central Processing Unit) 100 controls the whole image forming apparatus. An operating program of the CPU 100, a table which is referred to, and the like are held in a ROM (Read Only Memory) 101. A RAM (Random Access Memory) 102 is a work memory of the CPU 100 or a module in the image forming apparatus, which will be described hereinafter. The operating program of the CPU 100 may be held in the RAM 102 instead of the ROM 101. A system bus 103 in the image forming apparatus of the invention is provided. Image data 104 is input to the image forming apparatus.

The image data 104 is one of image data which is input from an image reading apparatus or the like (not shown), image data obtained by performing a ripping process in the image forming apparatus, and the like. Assuming that the image data 104 is, for example, luminance data of R, G, and B which is output from the image reading apparatus, an image processing unit 105 is constructed by a luminance/density converting unit, an N-value processing unit, and the like. The image processing unit 105 operates synchronously with a pixel clock 110, which will be described hereinafter.

An oscillator 106 generates a clock (first clock) necessary to drive the image forming apparatus of the invention or an apparatus of a system such as a multifunction apparatus including the image forming apparatus of the invention or the like. A clock 107 is oscillated and output by the oscillator 106. If the multifunction apparatus has a standard interface such as a USB (Universal Serial Bus) or the like, a frequency of the oscillator 106 which is built in the apparatus is limited. For example, in the case of the USB, a frequency of the clock 107 is equal to an oscillating frequency by which the clock of 48 MHz as a frequency for the standard interface can be formed.

A pixel clock generating unit 108 generates a high-frequency clock (second clock) 109 which is supplied to an image output unit 111 in the image forming apparatus and the pixel clock (third clock) 110 for handling the image data on a pixel unit basis. The image output unit 111 includes a print unit of the electrophotographic system and the image data which is transferred from the image processing unit 105 is controlled by using the pixel clock 110 and the high-frequency clock 109 which are generated from the pixel clock generating unit 108.

A PLL (Phase Locked Loop) 112 multiplies the clock 107 which is output from the oscillator 106 to a driving frequency of the CPU 100. A clock 113 multiplied by the PLL 112 is generally set to a very high frequency.

Figures 3, 4:
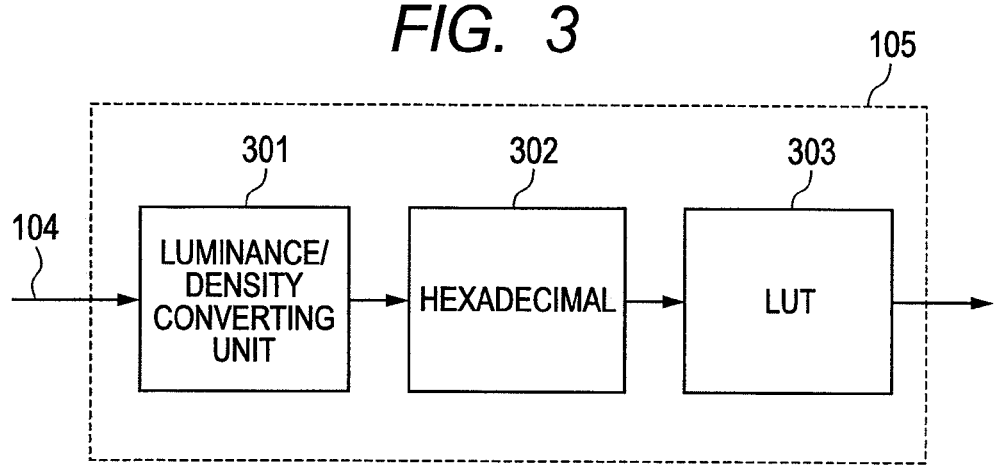
FIG. 3 is a constructional diagram of an image processing unit.
FIG. 4 is an example of table setting.

Subsequently, an internal construction of the image processing unit 105 will be described. FIG. 3 is a diagram illustrating a constructional example of the image processing unit 105. In the diagram, a luminance/density converting unit 301 converts luminance image data R, G, and B which is input as image data 104 into density signals C, M, Y, and K to be print-output.

An N-value processing unit 302 executes an N-value process to an output of the luminance/density converting unit 301. A value of N depends on an interface of the print unit of the electrophotographic system at a post stage. For example, if the interface of the print unit can receive 16-bit data, the N-value processing unit 302 converts the output of the luminance/density converting unit 301 into a signal of 4 bits (16 levels). In the conversion, a dither process, an error diffusing process, or the like may be used.

An LUT (Look Up Table) 303 is used to convert the N-value data converted by the N-value processing unit 302 into a format adapted to be output to the print unit. FIG. 4 illustrates an example of a table for converting the 16-value data into a format adapted to be output to the print unit.

In FIG. 4, an input value corresponds to an output of the N-value processing unit and indicates that the larger the number of "1" is, the higher the density is. Therefore, a minimum value of the density is equal to an input value b'0000 and a maximum value of the density is equal to an input value b'1111. An output value indicates output data to the print unit at the post stage and indicates that the larger the number of "1" is, the higher the density is in a manner similar to the input value.

For example, when the input value is equal to b'1000, the LUT 303 converts it into an output x'00FF (b'0000000011111111) of 16 bits and outputs. This means that since the number of "1" is equal to 8, a density level of the pixel after the printing indicates 8/16. An output value after the conversion is transferred at a frequency higher than the clock frequency at which the image data 104 is transferred.

In the case of the above example, in principle, the output value is output one bit by one at the high-frequency clock which is 16 times as high as the clock at which the image data 104 is transferred. Transferring order conforms with a form which the user wants to express as a print unit. In the case of transferring the output value illustrated in FIG. 4 from the lower bit, the 16-bit output value x'00FF has such a form that after "1" was output 8 times, "0" is output 8 times. Therefore, the expression by the print unit has a left-growth form. On the contrary, in the case of transferring the output value from the upper bit, after "0" was output 8 times, "1" is output 8 times. Therefore, the expression by the print unit has a right-growth form. The table illustrated in FIG. 4 is an example and there is also such a center-growth form that the number of "1" from the center is large.

Figure 5:
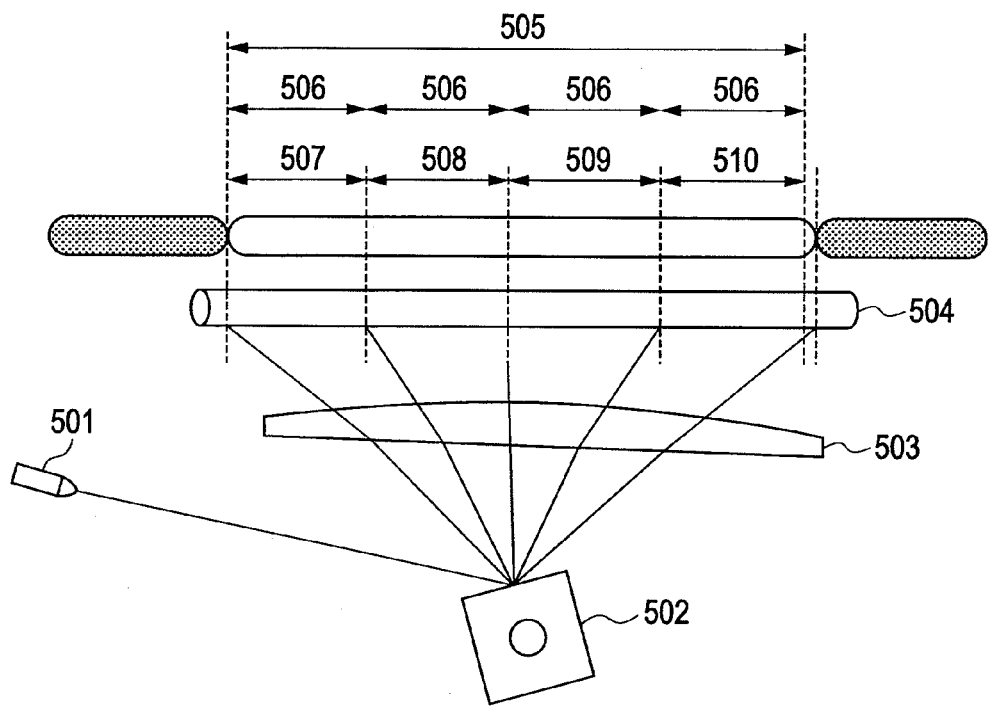
FIG. 5 is a diagram illustrating a construction of a print unit in an electrophotographic system.
Figure 6:
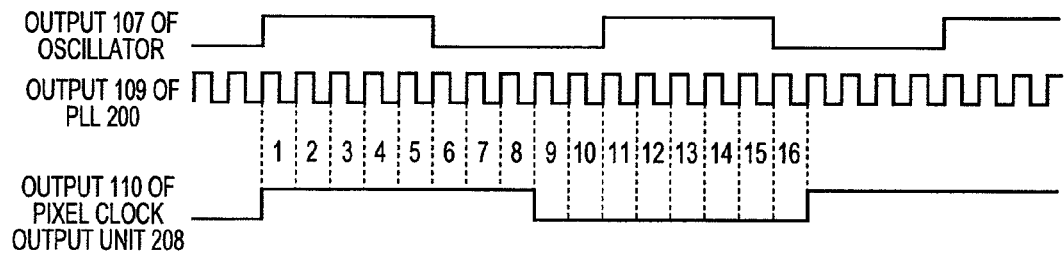
FIG. 6 is a diagram illustrating a correlation between a high-frequency clock and a pixel clock.

Subsequently, a construction of the image output unit 111 will be described. FIG. 5 is a diagram illustrating a construction of the print unit of the electrophotographic system. In FIG. 5, a laser beam irradiation port 501, a rotary polygon mirror (hereinbelow, referred to as a polygon mirror) 502, an fθ lens 503, and a photosensitive material 504 are provided. A laser beam irradiated from the laser beam irradiation port 501 is reflected by the polygon mirror 502 and reaches the photosensitive material 504 through the fθ lens 503.

Although the reflected laser beam is adjusted by the fθ lens 503 so as to reach the photosensitive material at a constant speed angle, an exposure of the image data in the main scanning direction is not reproduced by an equal length to the input data. In FIG. 5, a printable length in the main scanning direction is indicated by 505. If the length 505 is divided into four areas, a length 506 is ideally equal to ¼ of the length 505.

However, since the laser beam cannot be made to reach the photosensitive material 504 strictly at the constant speed by the fθ lens 503, the lengths of the four areas differ actually. In FIG. 5, lengths 507 and 508 are shorter than an equal length 506, and lengths 509 and 510 are longer than the equal length 506.

If the lengths of the areas in the main scanning direction are not equal, the image data which is exposed to the photosensitive material 504 becomes a distorted image in the print output of the image output unit 111. Therefore, a micro zoom is executed every area. Generally, control is made so as to equalize the lengths by inserting or extracting the pixel segment in accordance with a micro zoom ratio of each area.

Figure 2:
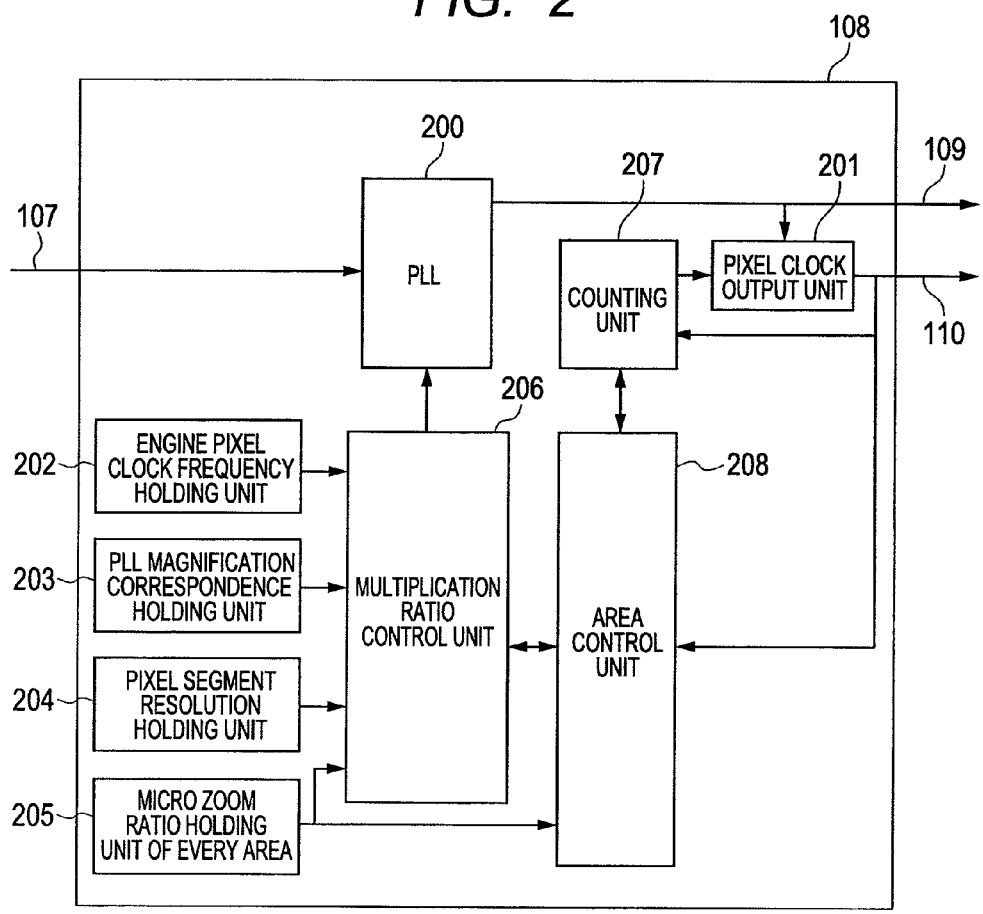
FIG. 2 is a constructional diagram of a pixel clock generating unit.

Subsequently, the pixel clock generating unit 108 as a most characteristic part in the invention will be described. FIG. 2 is a diagram illustrating an internal construction of the pixel clock generating unit 108. In FIG. 2, the same component elements as those in FIG. 1 are designated by the same reference numerals. The pixel clock generating unit 108 generates the high-frequency clock 109 and the pixel clock 110 from the clock 107 as an output of the oscillator 106 serving as a driving source of the image forming apparatus of the invention or the print unit including the image forming apparatus.

A PLL 200 outputs the high-frequency clock 109 by multiplying the frequency of the clock 107 which is input. It is a feature of the invention that it can cope with any of a case where the clock regarding the driving of the image forming apparatus is a single clock and a case where the print unit of the electrophotographic system constructed in the image output unit 111 operates by the clock of an arbitrary frequency. Therefore, it is desirable that a degree of freedom of the multiplication ratio which can be set in the PLL 200 is high.

This is because in the invention, by multiplying the clock 107, the high-frequency clock 109 which is output is set to a frequency higher than a high-frequency clock that is peculiar to the print unit of the electrophotographic system, thereby enabling the correction by the pixel segment insertion to be performed. The high-frequency clock that is peculiar to the print unit of the electrophotographic system is obtained by multiplying a desired pixel clock of the print unit by a value corresponding to the resolution. It is important to enable the correcting method to be realized only by the pixel segment insertion by using the high-frequency clock 109 formed as mentioned above excluding the extraction of the pixel segment.

A specific example will now be described. If only a value of n times is permitted as a setting of a multiplication ratio of the PLL 200 (n being an integer), such a setting that the clock 107 is made to approach the high-frequency clock 109 that is peculiar to the print unit of the electrophotographic system is limited. For example, it is now assumed that the frequency of the clock 107 is equal to 48 MHz and the high-frequency clock 109 that is peculiar to the print unit of the electrophotographic system is equal to 500 MHz. In this case, as a value of n adapted to form the high-frequency clock which is higher than the frequency of the high-frequency clock 109 that is peculiar to the print unit and is close to the frequency, it is set only to 11 (the high-frequency clock to be formed by the multiplication ratio of 11 is equal to 528 MHz).

On the other hand, if a value of n/m times can be set as a multiplication ratio of the PLL 200 (m being an integer), there are a variety of values as setting values of m or n which can be applied to the above example. For example, assuming that n=198 and m=19, a magnification of 10.42 times can be set and the high-frequency clock 109 which is formed is set to 500.16 MHz. As a setting near it, there are the following values: that is, 10.44 times (501.12 MHz) when n=188 and m=18; 10.47 times (502.56 MHz) when n=199 and m=19; and the like. A combination of n and m mentioned above is an example and so long as the setting magnification of the PLL 200 corresponds to n/m, a variety of many kinds of frequencies near 500 MHz can be formed even by other settings.

A pixel clock output unit 201 forms the pixel clock on the basis of the high-frequency clock 109 which is output from the PLL 200. An example in the case where the image output unit 111 can receive the image data of 16 bits. For simplicity of description, it is assumed that the high-frequency clock 109 is obtained by multiplying the clock 107 which is output from the oscillator 106 by 10. In this case, the pixel clock 110 which is output by the pixel clock output unit 201 is equal to the clock of 16 periods of the high-frequency clock 109 (hereinbelow, called "resolution 16") because the received 16-bit pixel data is output one bit by one. Although not shown, when the image data which is output by the image processing unit 105 is constructed by 5 bits, a period of the pixel clock 110 which is output by the image output unit 111 is equal to 32 periods of the high-frequency clock 109 (hereinbelow, called "resolution 32").

An engine pixel clock frequency holding unit (first holding unit) 202 holds a pixel clock frequency which is peculiar to the print unit of the image forming apparatus or the multifunction apparatus including the image forming apparatus. A PLL magnification correspondence holding unit (second holding unit) 203 holds a magnification setting format which can be set into the PLL 200. For example, if the PLL 200 can set n/m times, it is constructed so that the values of m and n can be held. A pixel segment resolution holding unit (third holding unit) 204 holds corresponding resolution as an interface of the print unit of the image forming apparatus. A micro zoom ratio holding unit (fourth holding unit) 205 holds a micro zoom ratio of every division area obtained by dividing the photosensitive material in the main scanning direction in the print unit of the image forming apparatus.

Each of the above holding units can be set by the CPU 100. That is, the apparatus is constructed in such a manner that even in the case where the print unit of the image output unit 111 constructed as an image forming apparatus was changed, by setting the value in each of the above holding units, it is possible to cope with an arbitrary print unit. Specifically speaking, the setting of the pixel segment resolution holding unit 204 is not limited to the resolution 16 or 32 but it is assumed that many kinds of resolution can be set in accordance with the print unit. Further, also with respect to the micro zoom ratio holding unit 205, the number of holding areas is not limited to 4 shown in FIG. 5 but it is assumed that an arbitrary value can be set.

A multiplication ratio control unit 206 controls the magnification of the PLL 200 on the basis of the information held in the engine pixel clock frequency holding unit 202, PLL magnification correspondence holding unit 203, pixel segment resolution holding unit 204, and micro zoom ratio holding unit 205. The magnification which is set into the PLL 200 by the multiplication ratio control unit 206 will be described in detail hereinafter. A counting unit 207 controls the counting based on the pixel clock 110 which is output by the pixel clock output unit 201.

An area control unit 208 discriminates an area by the information held in the micro zoom ratio holding unit 205 and the pixel clock 110 which is output by the pixel clock output unit 201 and controls the counting unit 207. Details of the magnification which is set into the PLL 200 by the multiplication ratio control unit 206, a detailed construction of the counting control, and details of the control of the counting unit 207 will be described hereinafter.

Figure 7:
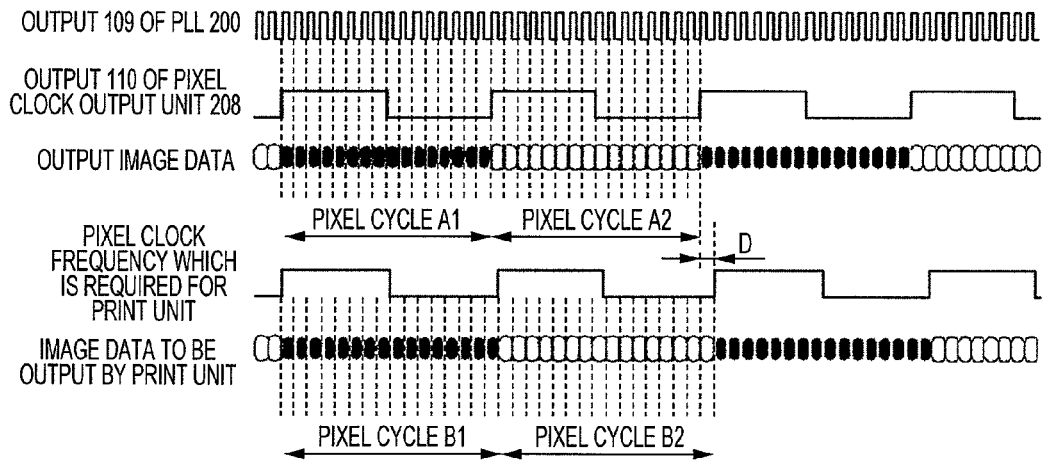
FIG. 7 is an example of a waveform before a micro zoom is executed.

The correction of the main scanning length by the pixel segment insertion will be further described with reference to another diagram. FIG. 7 illustrates relations among the output (high-frequency clock 109) of the PLL 200 before the correction by the pixel segment insertion, the output (pixel clock 110) of the pixel clock output unit 201, and the pixel clock frequency that is peculiar to the print unit constructed in the image output unit 111. In the case of the resolution 16, the pixel clock 110 is equal to 16 periods of the high-frequency clock 109. Assuming that the image data which is output to the print unit by the image output unit 111 is data in which black (0xFFFF) and white (0x0000) appear alternately, as illustrated in FIG. 7, the black data is output at 16 periods of a pixel cycle A1 and the white data is output at 16 periods of a pixel cycle A2. A period of the pixel cycle A1 and a period of the pixel cycle A2 are the same.

Since the pixel clock 110 is formed based on the multiplication high-frequency clock 109 of the clock 107 as an output of the oscillator 106, it does not coincide with the pixel clock period that is peculiar to the print unit in the image output unit 111. Therefore, a difference occurs between the pixel clock period (pixel cycle B1 or pixel cycle B2) that is peculiar to the print unit in the image output unit 111 and the period of the pixel clock 110 which is output by the pixel clock output unit 201.

For example, it is now assumed that a deviation of a half period of the high-frequency clock 109 to form the pixel clock 110 exists between the period of the pixel clock 110 and the pixel clock period that is peculiar to the print unit in the image output unit 111. In this case, a deviation of one period of the high-frequency clock 109 occurs per two periods of the pixel clock 110 (D in FIG. 7).

Figure 8:
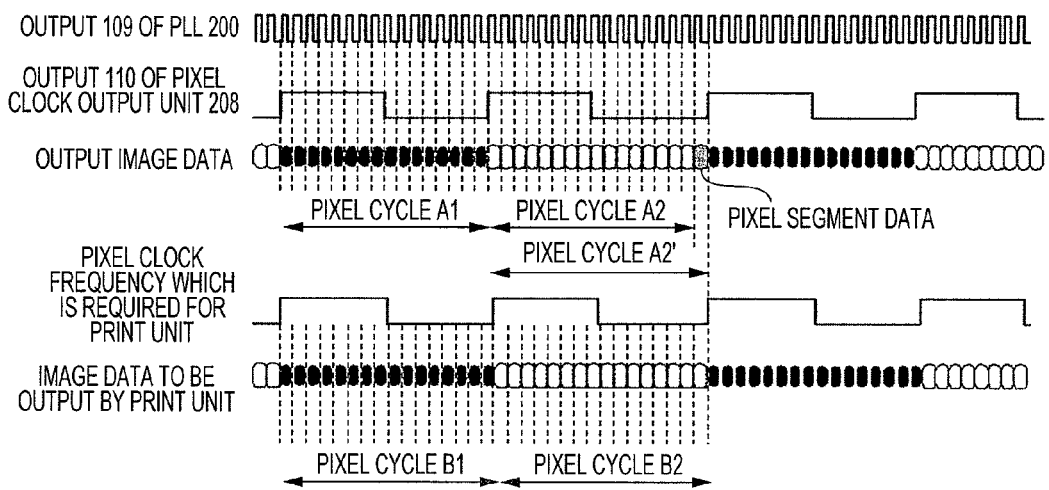
FIG. 8 is an example of a waveform after the micro zoom was executed.

In the correction by the pixel segment insertion, the difference of D in FIG. 7 is corrected. A relation between the pixel clock 110 after the correction and the output image data which is output to the print unit is illustrated in FIG. 8. It is assumed that prerequisite conditions in FIG. 8 are the same as those in FIG. 7 and there is a deviation of the half period of the high-frequency clock 109 between the period of the pixel clock 110 and the pixel clock period that is required for the print unit.

In this case, since the deviation of one period (D in FIG. 7) of the high-frequency clock 109 occurs per two periods of the pixel clock 110, the correction by the pixel segment insertion is performed in the pixel cycle A2 in which the period difference occurs. Therefore, a period corresponding to the position in the pixel cycle A2 of the pixel clock 110 is extended by a time of one cycle of the high-frequency clock 109 (pixel cycle A2'). The output image data of a portion where the high-frequency clock 109 was extended by the time of one cycle is formed based on the image data to be output at the period of the pixel clock 110. In FIG. 8, since the image data which is output at the position in the pixel cycle A2 is white (0x0000), "0" is transferred at the position of the high-frequency clock 109 which was extended by the time of one cycle.

There are many methods of selecting the image data which is transferred in the extended portion of the high-frequency clock 109 for the pixel segment insertion. The image data which was output in the one-preceding cycle of the high-frequency clock cycle to be extended may be used or the image data which is output in a predetermined transfer cycle of the high-frequency clock 109 in the pixel clock cycle may be used.

It is a feature of the invention that the period of the high-frequency clock 109 which is obtained by multiplying the single clock (clock 107) which is input to the image forming apparatus is used as a reference and the period is matched with the period of the pixel clock that is peculiar to the print unit by using the pixel segment inserting method. An insertion ratio of the pixel segments is obtained by a ratio between the period of the high-frequency clock 109 which is formed by the PLL 200 and the period obtained by multiplying the pixel clock period that is peculiar to the print unit by a value corresponding to the resolution and by a micro zoom ratio of every division area obtained by dividing the photosensitive material 504.

The number of insertion pixel segments of every division area obtained by dividing the photosensitive material 504 is defined by the number of pixels and the micro zoom ratio of the division area and the resolution of the print unit [equations (1), (2), (3)].

(The number of pixel segments of the division area)= (the number of pixels corresponding to the division area)×(resolution)  (1)

(The total number of pixel segments after the pixel segment insertion of the division area)=(the number of pixel segments of the division area)×(micro zoom ratio of the division area)  (2)

(The number of insertion pixel segments of the division area)=(the total number of pixel segments after the insertion of the pixel segments of the division area)−(the number of pixel segments of the division area)  (3)

For example, when the number of pixels corresponding to the area shown at 507 is equal to 500, the micro zoom ratio of the division area is equal to 1.012, and the resolution is equal to 16, the number of pixel segments which are inserted is obtained as follows by the equations (1) to (3).

(The number of pixel segments of the division area)=500×16=8000

(The total number of pixel segments after the pixel segment insertion of the division area)=8000× 1.012=8096

(The number of insertion pixel segments of the division area)=8096−8000=96

That is, it is demanded to control so as to insert the pixel segments into 96 pixels among the 500 pixels.

On the other hand, a ratio between the frequency of the high-frequency clock 109 which is obtained by multiplying the single clock and the frequency which is obtained by multiplying the pixel clock of the print unit by a value corresponding to the resolution is multiplied. For example, when the frequency of the high-frequency clock 109 is equal to 512 MHz and the frequency which is obtained by multiplying the pixel clock of the print unit by the value corresponding to the resolution is equal to 500 MHz, a ratio between them is obtained by the following expression (4).

(Frequency of the high-frequency clock 109)÷(frequency which is obtained by multiplying the pixel clock of the print unit by the value corresponding to the resolution)      (4)

By substituting the frequency into the expression (4), 512÷500=1.024 (times) is obtained.

That is, in the case of the above example, the final number of insertion pixel segments is obtained as follows.

(The number of insertion pixel segments of the division area)×(ratio between the high frequency and the frequency)=96×1.024=98.3

Therefore, by inserting the 98 or 99 pixel segments into the 500 pixels constructing the division area, the distortion in the main scanning direction which cannot be perfectly corrected by the fθ lens 503 is corrected [the insertion ratio is set so that 10 pixel segments are inserted into the 51 pixels].

By inserting the calculated pixel segments in accordance with each insertion ratio of each division area, the distortion in the main scanning direction which cannot be corrected by the fθ lens 503 is corrected. However, the image data which is print-output does not always have high quality. It is not always necessary that the frequency of the high-frequency clock 109 which is formed by the PLL 200 is made to approach the frequency obtained by multiplying the pixel clock depending on the print unit of the image forming apparatus by the value corresponding to the resolution. A description will be made in detail hereinbelow with reference to another diagram.

Figure 9:
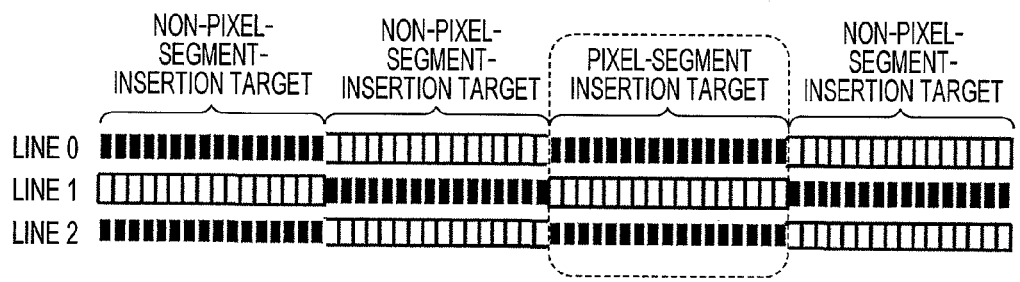
FIG. 9 is a conceptual diagram in the case where the micro zoom was executed to a predetermined value in the main scanning direction.

FIG. 9 illustrates a case where the pixel segments were inserted to a fixed pixel position in the main scanning direction of one division area. FIG. 9 illustrates an example in the case where in an odd-number designated line, the image data is output in order of the black pixels and the white pixels and, in an even-number designated line, the image data is output in order of the white pixels and the black pixels. A pixel-segment-insertion target is surrounded by a broken line. In line 0, it is shown that the third pixel from the top is the pixel-segment-insertion target. In this case, the image data which is print-output is conspicuous because the pixel segments are inserted to the same pixel position in the main scanning direction and the periodic insertion of the pixel segments becomes a texture.

In order to prevent such a situation that the pixel segments are always inserted to the same pixel position in the main scanning direction, a method whereby the main scanning position for pixel segment insertion is changed every line is considered. For example, control is made in such a manner that the positions in the main scanning direction where the pixel segments are inserted are not continuous in the sub-scanning direction by random numbers. An example in this case is illustrated in FIG. 10.

Figure 10:
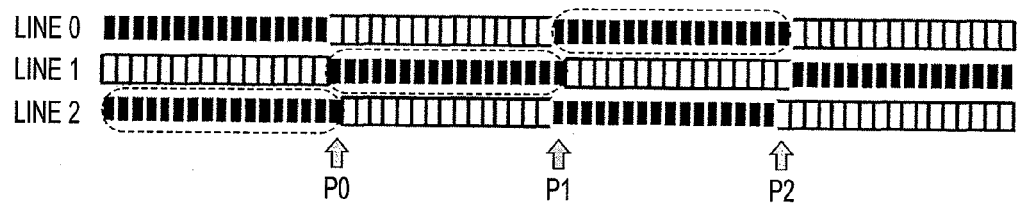
FIG. 10 is a conceptual diagram in the case where the micro zoom was executed at random positions in the main scanning direction.

In FIG. 10, the image data which is output is substantially the same as that in FIG. 9, that is, in the odd-number designated line, the image data is output in order of the black pixels and the white pixels and, in the even-number designated line, the image data is output in order of the white pixels and the black pixels. It is assumed that the pixel-segment-inserting positions of each line are controlled by the random numbers, so that it is shown that the pixel surrounded by a broken line corresponds to the pixel-segment-inserting position in FIG. 10. Therefore, with respect to line 0, the third pixel from the top is set to the pixel-segment-inserting position. Since the pixel data to be output at the third pixel is the black data, the black pixel segments are inserted at the pixel-segment-inserting positions.

With respect to line 1, it is shown that the second pixel is set to the pixel-segment-inserting position. Since the pixel data to be output at the second pixel is the black data, the black pixel segments are inserted at the pixel-segment-inserting positions. Thus, the next white pixel data is output so as to be deviated in the main scanning direction by a distance corresponding to one resolution (1/16 pixel segment).

With respect to line 2, it is shown that the first pixel is the pixel-segment-inserting position.

Since the pixel data to be output at the first pixel is also the black data, the black pixel segments are inserted at the pixel-segment-inserting positions. Thus, the next and subsequent white pixel data and black pixel data are output so as to be deviated by a distance corresponding to one resolution (1/16 pixel segment).

In the case of using such a method, although the pixel-segment-inserting positions are not concentrated on the predetermined position in the main scanning direction, another problem occurs. Attention points are P0, P1, and P2. For example, when attention is paid to P0, the black pixel segments of line 1 and the black pixel segments of line 2 are reproduced so as to be continuous in the sub-scanning direction. At P1, the black pixel segments of line 0, the black pixel segments of line 1, and the black pixel segments of line 2 are continuous. Further, at P2, the white pixel segments of line 1 and the white pixel segments of line 2 are continuous.

That is, if the control is made so that the pixel-segment-inserting positions are not continuous in the sub-scanning direction by the random numbers, the overlap of the black pixel segments and the overlap of the white pixel segments are reproduced in the print output.

If such a conventional construction that the pixel clock that is peculiar to the print unit is generated from a device different from the oscillator of the image forming apparatus is used, a correction magnification by the pixel segment insertion is very small, an influence degree may be small. However, according to the control by the single clock, the zoom ratio of every division area is larger than that in at least the construction individually having the oscillator of the print unit. In other words, since the number of pixel-segment-inserting positions increases, many texture reproducing positions or many overlapping positions of the black pixel segments and many overlapping positions of the white pixel segments occur.

Therefore, in the image forming apparatus of the invention, the frequency of the high-frequency clock 109 is controlled so the pixel segment insertion is performed in each pixel constructing the main scanning direction. More specifically speaking, the setting magnification of the PLL 200 at which the pixel segment insertion is performed in each pixel is obtained on the basis of the frequency of the pixel clock that is peculiar to the print unit, the resolution, the micro zoom ratio of each division area of the photosensitive material 504, and the setting-possible magnification information to which the PLL 200 corresponds.

For example, in the case of the resolution 16, when one pixel segment is inserted to each pixel, each pixel is constructed by 17 pixel segments. A magnification in this case is equal to 17÷16=1.0625 times. That is, if arithmetic operation results of the equations (1) to (3) and the expression (4) are equal to 1.0625, the pixel segment is inserted to each pixel. If the magnification setting of the PLL 200 is performed so that the high-frequency clock 109 which is obtained by count-back calculations of them is formed, the texture, the overlap of the black pixel segments, and the overlap of the white pixel segments can be avoided.

Figure 11:
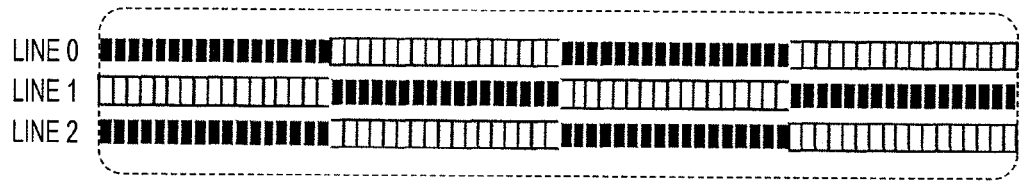
FIG. 11 is a conceptual diagram in the case where the micro zoom was executed to previous pixels in the main scanning direction.

A state constructed as mentioned above is illustrated in FIG. 11. Although the pixel-segment-insertion target is surrounded by a broken line, since all pixels become the targets in this case, the pixel segments have been inserted to each pixel. That is, each of the black pixel and the white pixel of each line is constructed by 17 pixel segments. Thus, there is no overlap of the black pixel segments or the white pixel segments in the sub-scanning direction and the image output of high quality of the print unit can be obtained.

If a plurality of division areas exist and the micro zoom ratios due to the division areas differ, in the image forming apparatus, by making the number of constructions of the PLLs corresponding to the PLL 200 coincide with the number of division areas, the pixel segment insertion to all pixels in the main scanning direction can be performed. However, in the magnification setting of the single PLL 200, the pixel segment insertion to all of the pixels cannot be attained. In this case, it is assumed that the most effective magnification of the PLL 200 is set in consideration of the micro zoom ratios of all of the division areas. Although the pixel segment insertion is not performed to all pixels, since the number of pixel positions where the pixel segment insertion is not performed is small, the texture or the portions where the black pixel segments and the portions where the white pixel segments are continuous become inconspicuous.

Subsequently, a discrimination about the pixel segment inserting position will be described. By counting the pixel clock 110 which is output by the pixel clock output unit 201, the area control unit 208 recognizes the pixel position in the main scanning direction. It is assumed that a counter for counting the pixel clock 110 is cleared (initialized) by a control signal of a line unit (not shown).

On the basis of a count value, the area control unit 208 discriminates to which division area of the photosensitive material 504 the pixel position in the main scanning direction belongs. The micro zoom ratio according to the discriminated division area is set into the counting unit 207. It is assumed that each time the division area of the photosensitive material 504 is switched, the area control unit 208 sets the corresponding micro zoom ratio into the counting unit 207.

Figures 12, 13:
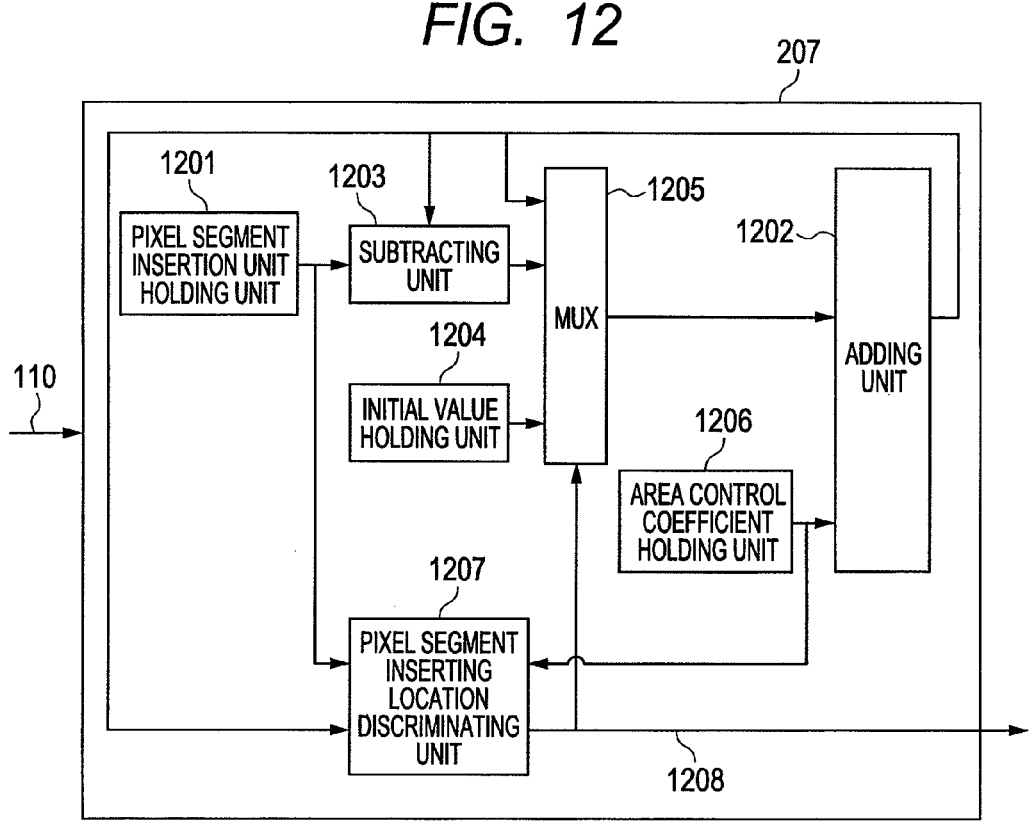
FIG. 12 is a constructional diagram of a counting unit.
FIG. 13 is a diagram illustrating target pixels to which the micro zoom is executed.

On the basis of the setting of the area control unit 208, the counting unit 207 detects the pixel position in the main scanning direction where the pixel segment is inserted. An internal construction of the counting unit 207 is illustrated in FIG. 12. The same component elements as those illustrated in FIGS. 1 and 2 are designated by the same reference numerals. In FIG. 12, the counting unit 207 is constructed by a synchronizing circuit by the pixel clock 110 which is input. A unit in which the pixel segment of every division area of the photosensitive material 504 is inserted has been held in a pixel segment insertion unit holding unit 1201. For example, if the pixel segment is inserted to one pixel among the 14 pixels, a value which is held in the pixel segment insertion unit holding unit 1201 is equal to 14.

An adding unit 1202 as a center element of the counting unit 207 outputs an arithmetic operation result serving as a reference of the discrimination about the pixel segment inserting position. The detailed operation of the adding unit 1202 will be described hereinafter. A subtracting unit 1203 outputs a result obtained by subtracting the value held in the pixel segment insertion unit holding unit 1201 from the output of the adding unit 1202. An initial value holding unit 1204 holds an initial value of the adding unit 1202.

The arithmetic operation output of the adding unit 1202, the arithmetic operation output of the subtracting unit 1203, and the initial value held in the initial value holding unit 1204 are input to a selector (MUX) 1205. The selector 1205 outputs a value to the adding unit 1202 on the basis of a selection signal, which will be described hereinafter. An area control coefficient holding unit 1206 holds the number of insertion pixel segments of every division area of the photosensitive material 504. For example, in the case where the user wants to insert three pixel segments while the pixel segment insertion unit held in the pixel segment insertion unit holding unit 1201 is used as a unit, a value which is held in the area control coefficient holding unit 1206 is equal to 3.

With reference to the value held in the pixel segment insertion unit holding unit 1201 and the arithmetic operation output of the adding unit 1202, a pixel segment inserting location discriminating unit 1207 outputs a discrimination signal (1208) to discriminate whether or not the next pixel clock 110 is set to a cycle in which the pixel segments have been inserted.

The operation of the counting unit 207 will be described further in detail. For example, it is assumed that a pixel segment insertion ratio of the division area is equal to 3 pixels among the 14 pixels. In this case, the CPU 100 or the area control unit 208 sets 14 into the pixel segment insertion unit holding unit 1201 of the counting unit 207 and sets the number of pixel segments which are inserted into the unit pixel, that is, 3 into the area control coefficient holding unit 1206. As a value which is set into the initial value holding unit 1204 by the CPU 100 or the area control unit 208, a value smaller than the value held in the pixel segment insertion unit holding unit 1201 is set. However, a case where 0 has been set will be described hereinbelow.

The counting unit 207 operates in accordance with the input of the pixel clock 110 corresponding to the input image data. As an input initial value of the adding unit 1202, that is, an output of the MUX 1205, 0 held in the initial value holding unit 1204 is output. Since 3 has been held in the area control coefficient holding unit 1206, the adding unit 1202 outputs the arithmetic operation result of (0±3), that is, 3 by the pixel clock 110 corresponding to the first pixel input.

With respect to the first discrimination, when the output of the adding unit 1202 is smaller than the value held in the area control coefficient holding unit 1206, the pixel segment inserting location discriminating unit 1207 makes a discrimination about the pixel segment inserting location (expression (5)). With respect to the second and subsequent discrimination, when the output value of the adding unit 1202 is larger than the result held in the pixel segment insertion unit holding unit 1201 (in the description, 14 is held), a discrimination about the pixel segment inserting location is made (expression (6)). The reason why such control is made is that in each of the division areas obtained by dividing the photosensitive material 504, even if any value has been set into the initial value holding unit 1204, it is intended to uniformly insert the pixel segments of the number corresponding to the value held in the area control coefficient holding unit 1206 every line.

<Line First Discrimination>

$$\text{(Output of the adding unit 1202)} < \text{(value held in the area control coefficient holding unit 1206)} \quad (5)$$

<Line Second Discrimination and Subsequent Discrimination>

$$\text{(Output of the adding unit 1202)} > \text{(value held in the pixel segment insertion unit holding unit 1201)} \quad (6)$$

In the case of the present description example, since the first output of the adding unit 1202 is equal to 0 and the value held in the area control coefficient holding unit 1206 is equal to 3, the expression (5) is satisfied. Therefore, it is determined in the first discrimination that the pixel is the pixel-segment-insertion target.

The MUX 1205 is controlled so as to output the value held in the initial value holding unit 1204 before the output of the result of the first discrimination and output the value from the adding unit 1202 before the output of the result of the second discrimination. With respect to the results of the third discrimination and subsequent discrimination, the output is controlled in accordance with a value of the discrimination result 1208 as a discrimination result signal of the pixel segment inserting location discriminating unit 1207. For example, if the discrimination result 1208 indicates the pixel segment inserting location, the value of the subtracting unit 1203 is output and in other cases, the value from the adding unit 1202 is output.

In the present description, the output of the adding unit 1202 after the output of the first discrimination result by the input of the pixel clock 110 is equal to 3. Therefore, the pixel segment inserting location discriminating unit 1207 makes a discrimination by using the output of the adding unit 1202. Specifically speaking, the pixel segment inserting location discriminating unit 1207 discriminates with reference to the second output value 3 of the adding unit 1202 and the holding value 14 of the pixel segment insertion unit holding unit 1201. In this case, since the expression (6) is not satisfied, it is determined that the location is not the pixel segment inserting location.

The MUX 1205 selects the output value of the adding unit 1202 at the time of the second discrimination. Therefore, the output value of the adding unit 1202 and the holding value of the area control coefficient holding unit 1206 are input to the adding unit 1202. Thus, the output of the adding unit 1202 is equal to 6 in accordance with the input of the pixel clock 110. The pixel segment inserting location discriminating unit 1207 compares the output value of the adding unit 1202 with the value in the pixel segment insertion unit holding unit 1201, thereby discriminating the pixel segment inserting location. Also in this case, since the expression (6) is not satisfied, it is determined that the pixel is not the pixel-segment-insertion target.

FIG. 13 illustrates a result of the pixel segment inserting location discrimination result of the line head 14 pixels in the case where the control was made as mentioned above. In FIG. 13, the pixel position in the main scanning direction indicates the pixel position from the top of the line. The pixel position 13 in the main scanning direction indicates the input pixel position 14. The output of the adding unit 1202 indicates the value which is output by the adding unit 1202 in accordance with the input of the pixel clock 110 and is equal to a value obtained by accumulating the values held in the area control coefficient holding unit 1206 every input of the pixel clock 110. With respect to the pixel-segment-insertion target, the discrimination result of the pixel segment inserting location discriminating unit 1207 is shown. The pixel position shown by ○ indicates that the pixel is the pixel-segment-insertion target. The pixel position shown by × indicates that the pixel is the non-pixel-segment-insertion target.

In FIG. 13, the determination portion of the pixel-segment-insertion target of the sixth input pixel (pixel position in the main scanning direction: 5) as a characteristic part will now be described. The output of the adding unit 1202 at a point of time of the fifth input pixel is equal to 12. Therefore, by the input of the pixel clock 110, the value held in the area control coefficient holding unit 1206 is added to the output of the adding unit 1202 and 15 is output. The pixel segment inserting location discriminating unit 1207 compares the output value 15 of the adding unit 1202 with the value 14 held in the pixel segment insertion unit holding unit 1201 and outputs the discrimination result 1208. When it is confirmed as a comparison result that the expression (6) is satisfied, the pixel segment inserting location discriminating unit 1207 outputs the discrimination result 1208 showing that the pixel is the pixel-segment-insertion target.

At this time, in the subtracting unit 1203, the holding value in the pixel segment insertion unit holding unit 1201 is subtracted from the output value of the adding unit 1202. Therefore, the subtracting unit 1203 outputs "1" obtained by subtracting 14 from 15 to the MUX 1205. When the discrimination result 1208 of the pixel segment inserting location discriminating unit 1207 indicates that the pixel is the pixel-segment-insertion target, the MUX 1205 outputs the output value of the subtracting unit 1203 to the adding unit 1202. That is, 1 is output at the time of the discrimination of the next input pixel position.

By controlling in this manner, the discrimination about the pixel-segment-insertion target is made. In the above description example, the pixel segment insertion unit is set to 14 and the number of insertion pixel segments is set to 3. It will be understood that the pixel-segment-insertion targets are shown by ○ at three positions and the control is satisfied. In FIG. 13, although the discrimination about the 14 pixels of the line head has been illustrated, in the pixels constructing the division area of the photosensitive material 504, by repetitively controlling, the pixel segment insertion of predetermined division areas is enabled.

If the division area of the photosensitive material 504 was switched, the value in the pixel segment insertion unit holding unit 1201 and the value in the area control coefficient holding unit 1206 are reset by the CPU 100 or the area control unit 208. If the pixel segment insertion unit holding unit 1201 and the area control coefficient holding unit 1206 are constructed in such a manner that the values of the number as many as the division areas of the photosensitive material 504 can be held, control is made so as to separately count the pixel clock 110 and switch the pixel segment insertion unit and the area control coefficient corresponding to the belonging area.

In the method of the invention, it is presumed as a prerequisite that the magnification of the PLL 200 is set in accordance with the resolution so that the pixel segments are inserted to all pixels. However, if there are not a few pixels in which no pixel segments are inserted exist in every division area of the photosensitive material 504, it is necessary to control so that the pixel segment inserting positions are not continuous in the sub-scanning direction. In this case, control is made by the CPU 100 or the area control unit 208 so that the value in the initial value holding unit 1204 is made variable on a line unit basis. For example, the value in the initial value holding unit 1204 may be changed by the random number control of M series or a plurality of predetermined values may be set at random.

The discrimination result 1208 of the pixel-segment-insertion target which is output by the counting unit 207 is output to the pixel clock output unit 201 at the post stage. Since the high-frequency clock 109 which is output by the PLL 200 has been input to the pixel clock output unit 201, the period of the pixel clock 110 can be changed in accordance with the discrimination result 1208. That is, such control that the period of the pixel clock 110 is changed only for the pixel positions serving as pixel-segment-insertion targets can be made instead of such a form that a plurality of pixel clocks are formed and selected.

Figure 14:
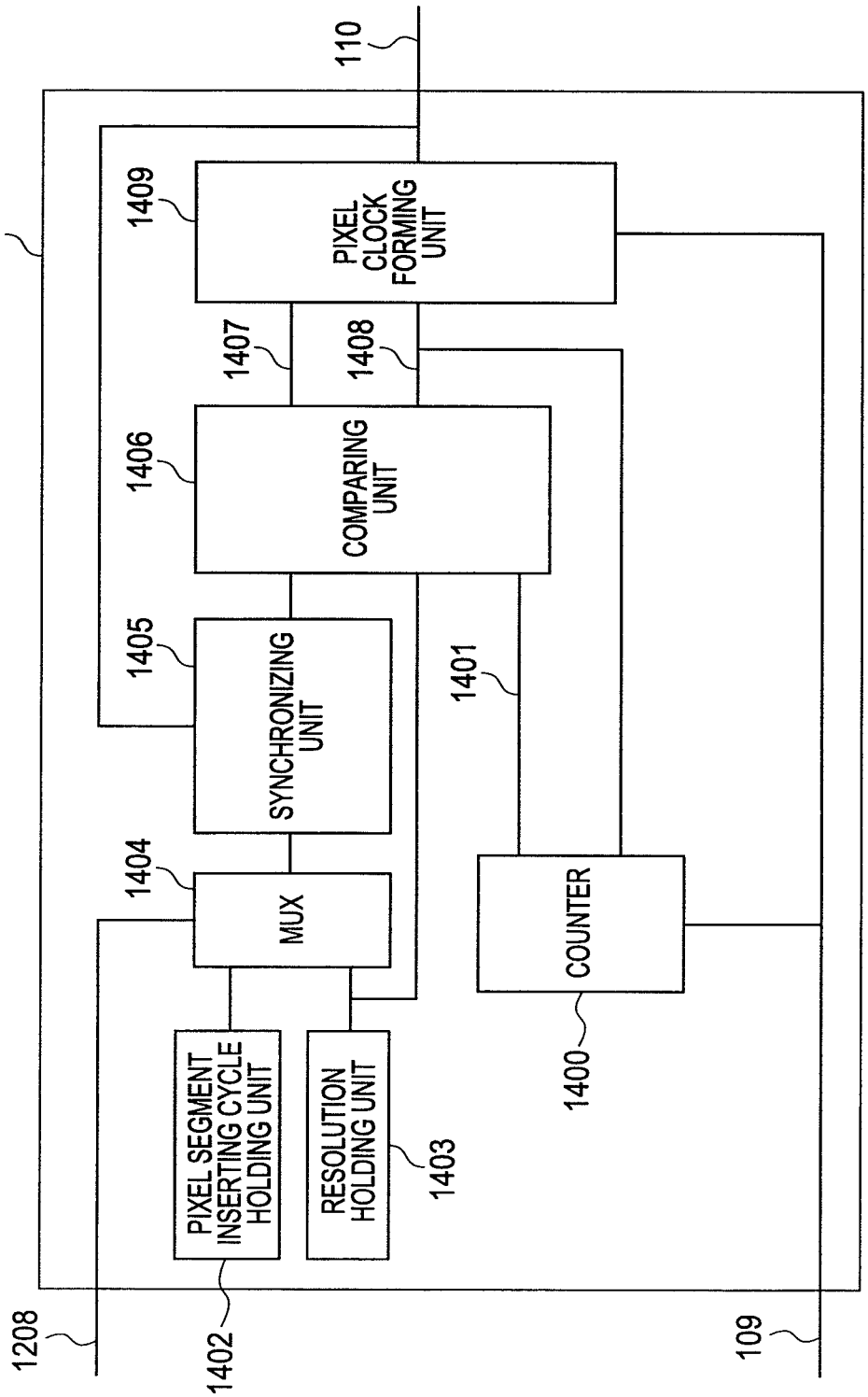
FIG. 14 is a constructional diagram of a pixel clock output unit.

FIG. 14 illustrates a detailed construction of the pixel clock output unit 201. Also in FIG. 14, the same component elements as those in FIG. 2 are designated by the same reference numerals. In FIG. 14, counter 1400 counts in accordance with the input of the high-frequency clock 109 and outputs a count value 1401. A pixel segment inserting cycle holding unit 1402 holds a value obtained by adding 1 to the resolution. A resolution holding unit 1403 is provided. An MUX 1404 outputs either the holding value of the pixel segment inserting cycle holding unit 1402 or the holding value of the resolution holding unit 1403. A synchronizing unit 1405 synchronizes the output value of the MUX 1404 by the pixel clock 110. A comparing unit 1406 compares the count value 1401 of the counter with a value obtained by dividing the value held in the resolution holding unit by 2 or with the output value of the synchronizing unit 1405. If the count value is equal to the value obtained by dividing the value held in the resolution holding unit 1403 by 2, a comparison result 1407 is set to the High level. If the count value is equal to the output of the synchronizing unit 1405, a comparison result 1408 is set to the High level.

A pixel clock forming unit 1409 forms the pixel clock 110. When the comparison result 1408 is at the High level, the pixel clock forming unit 1409 outputs a High level signal in response to a leading edge of the high-frequency clock 109. Control is made so that when the comparison result 1407 is at the High level, the pixel clock forming unit 1409 outputs a Low level signal in response to a leading edge of the high-frequency clock 109.

Figure 15:
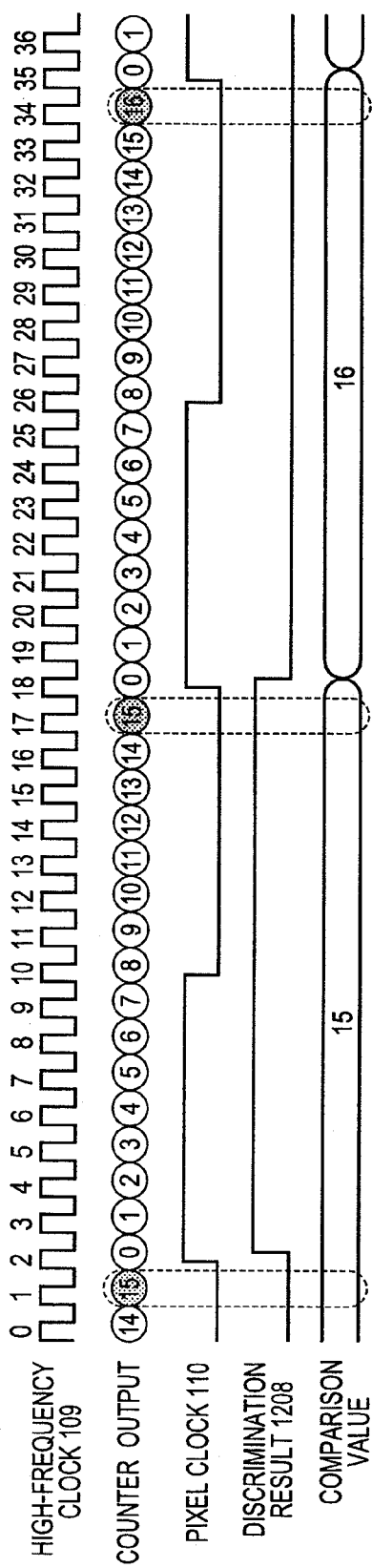
FIG. 15 is an example of a waveform of a pixel clock cycle generation when the micro zoom is executed.

FIG. 15 illustrates an outline of generation of the pixel clock 110 according to the discrimination result 1208 which is output by the pixel segment inserting location discriminating unit 1207. An example illustrated in FIG. 15 relates to the case of the resolution 16. The pixel clock 110 of the non-pixel-segment-insertion target pixel is equal to 16 cycles of the high-frequency clock 109 which is output by the PLL 200. The pixel clock 110 of the pixel-segment-insertion target pixel is equal to 17 cycles of the high-frequency clock 109 which is output by the PLL 200.

FIG. 15 will be described further in detail. The pixel segment inserting location discriminating unit 1207 outputs the discrimination result 1208 synchronously with the pixel clock 110 which is input. The high-frequency clock 109 which is output by the PLL 200 is counted by the counter 1400. A comparison value is switched in accordance with a level of the discrimination result 1208 synchronized with the pixel clock 110. That is, if the discrimination result 1208 is at the level ("Low level") showing the non-pixel-segment-insertion target pixel in response to the leading edge (cycle 1, 34) of the high-frequency clock 109 at a point of time when the output value of the counter 1400 coincides with the comparison value, the holding value of the resolution holding unit 1403 is output. If the discrimination result 1208 is at the level ("High level") showing the pixel-segment-insertion target pixel in response to the leading edge (cycle 17) of the high-frequency clock 109 at a point of time when the output value of the counter 1400 coincides with the comparison value, the value held in the pixel segment inserting cycle holding unit 1402 is output.

The pixel clock 110 is generated to have the "High level" (cycle 1, 17, 34) at a point of time when the count value of the counter is equal to the value which is output by the synchronizing unit 1405. It is generated to have the "Low level" (cycle 9, 25) at a point of time when the count value reaches the value obtained by dividing the holding value of the resolution holding unit 1403 by 2.

Therefore, when the pixel is the non-pixel-segment-insertion target, the time of the High level and the time of the Low level are equal. When the pixel is the pixel-segment-insertion target, the time of the High level is shorter than the time of the Low level by a time corresponding to one period of the high-frequency clock 109. It is assumed that when the comparison result 1408 is set to the High level by the comparing unit 1406, the counter 1400 is cleared to 0 in response to the leading edge of the high-frequency clock 109.

As mentioned above, by counting the high-frequency clock 109 formed by the PLL 200 and changing the count value to be compared in response to the discrimination signal indicative of the pixel-segment-insertion target or the non-pixel-segment-insertion target, the pixel clock 110 can be formed. Therefore, since a form in which a plurality of pixel clocks are formed and selected is not used, a circuit scale of the image forming apparatus can be simplified and radiation noises can be reduced.

Figure 16:
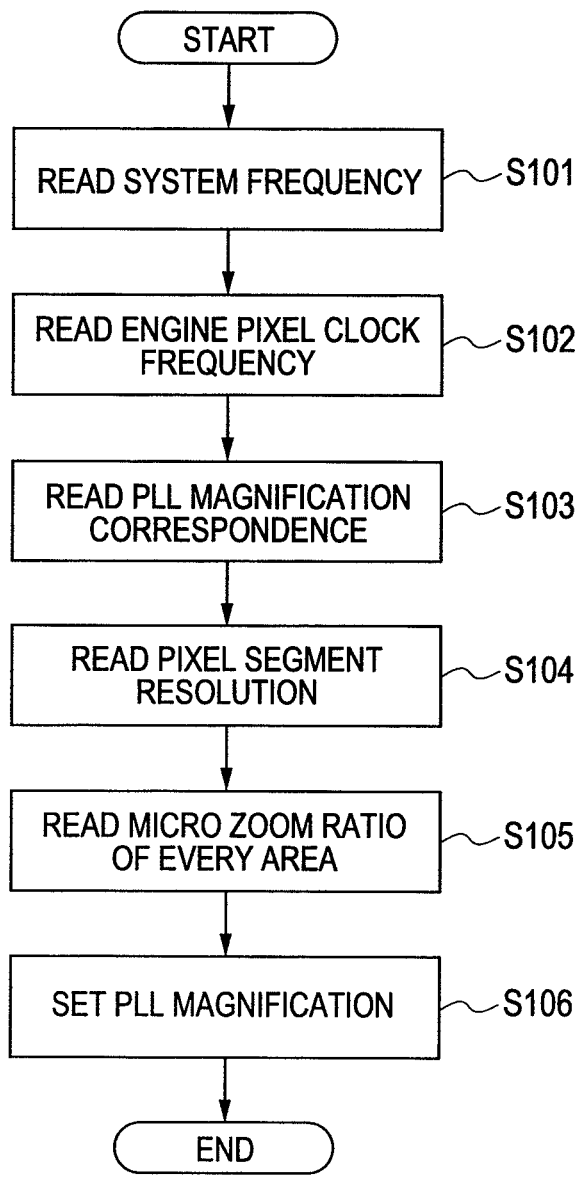
FIG. 16 is a control flow before activation in the invention.

Subsequently, the operation of the image forming apparatus of the invention will be described with reference to another diagram. FIG. 16 is a flowchart for setting the magnification of the PLL 200. Although the control mainly about the CPU 100 will be described hereinbelow, the area control unit 208 may perform similar control. The CPU 100 reads a frequency of a system clock constructed in the image forming apparatus, that is, the clock 107 which is output by the oscillator 106 (step S101). Since the frequency of the clock 107 is a single frequency every image forming apparatus which is constructed, it may be held into a holding unit in the CPU 100 or into the ROM 101 or RAM 102. That is, it is sufficient to construct in such a manner that such a frequency can be referred to at a point of time before the start of the operation of the image forming apparatus of the invention.

Subsequently, the CPU 100 reads a desired pixel clock frequency of the print unit of the image forming apparatus, that is, the value held in the engine pixel clock frequency holding unit 202 (step S102). If the pixel clock frequency of the print unit in the image forming apparatus is a single frequency, it is also possible to use such a construction that it is held into the holding unit in the CPU 100 or into the ROM 101 or RAM 102 in a manner similar to the form of holding the frequency of the clock 107.

Subsequently, the CPU 100 reads a magnification correspondence which can be set into the PLL 200 constructed in the image forming apparatus, that is, reads the value held in the PLL magnification correspondence holding unit 203 (step S103). For example, if the PLL 200 can set the magnification of n/m times, the values of m and n are read.

Subsequently, the CPU 100 reads the resolution to which the print unit in the image forming apparatus corresponds, that is, reads the micro zoom ratio of every division area of the photosensitive material 504 (step S104, S105). By the read control in steps S101 to S105 and the equations (1) to (3) and the expression (4), the CPU 100 can calculate the number of insertion pixel segments of every division area of the photosensitive material 504. The CPU 100 sets the magnification of the PLL 200 so that the pixel segments are inserted into each pixel data which is input. That is, a multiplication value adapted to multiply the system frequency (frequency of the clock 107) which was read in step S101 by the PLL 200 is calculated and the magnifications (m and n) are set. If the pixels in which no pixel segments are inserted exist in the division area of the photosensitive material 504, the CPU 100 makes the control regarding the pixel segment insertion ratio of every area.

Figure 17:
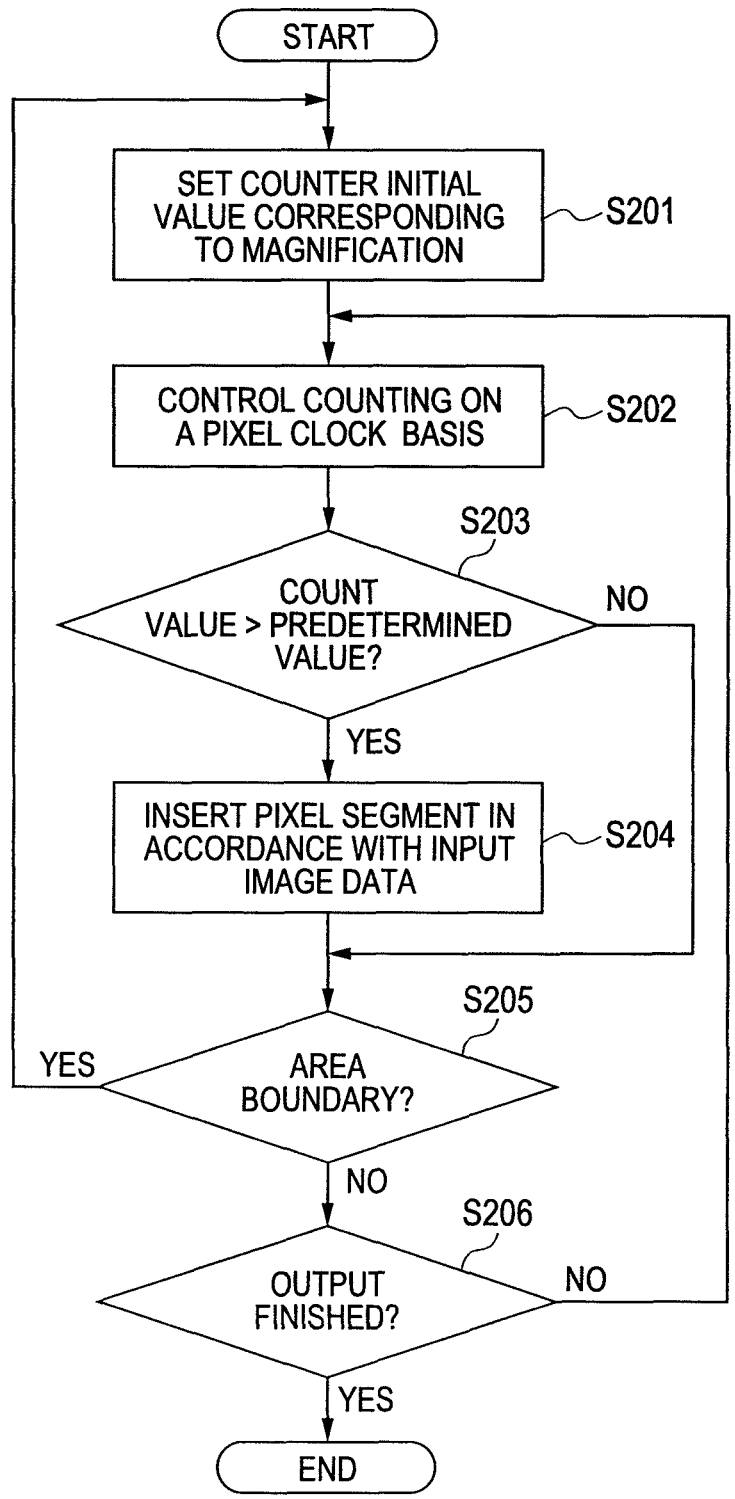
FIG. 17 is a control flow when the micro zoom is executed in the invention.

FIG. 17 illustrates the control which is made by the CPU 100 and is concerned with the pixel segment insertion ratio of every division area of the photosensitive material 504. The CPU 100 sets the magnification of every division area of the photosensitive material 504, that is, a count initial value according to the number of insertion pixel segments (step S201). The CPU 100 sets the period for inserting the pixel segments into the pixel segment insertion unit holding unit 1201 and sets the number of pixel segments which are inserted at such a period into the area control coefficient holding unit 1206. If the holding units of the number as many as the division areas of the photosensitive material 504 exist, the setting to all of the division areas is executed in a state before the activation of the image forming apparatus. When the setting of the magnification is finished, the CPU 100 makes activation control of the image forming apparatus.

When the activation control is made from the CPU 100, the image forming apparatus of the invention starts the operation. The PLL 200 multiplies the clock 107 by the magnification set by the CPU 100 and outputs the high-frequency clock 109. The pixel clock output unit 201 forms the pixel clock 110 according to the resolution by the high-frequency clock 109. On the basis of the input of the pixel clock 110 from the pixel clock output unit 201, the adding unit 1202 constructed in the counting unit 207 performs the addition by using the holding value set in the area control coefficient holding unit 1206 by the CPU 100 (step S202).

The pixel segment inserting location discriminating unit 1207 of the counting unit 207 compares the output value of the adding unit 1202 with the value held in the pixel segment insertion unit holding unit 1201 (step S203). When the output value of the adding unit 1202 is larger than the holding value in the pixel segment insertion unit holding unit 1201, the pixel segment inserting location discriminating unit 1207 outputs the discrimination result 1208 of the level indicating that the pixel is the pixel-segment-insertion target pixel.

If the discrimination result 1208 indicates that the pixel is the pixel-segment-insertion target pixel, the pixel clock output unit 201 outputs a value obtained by adding 1 to the resolution as a count comparison value of the high-frequency clock 109, thereby controlling the period of the pixel clock 110 so as to be longer by a time corresponding to 1/resolution. In one cycle of the high-frequency clock 109 of the extended period, the pixel segments corresponding to the image data which is output as data of the relevant pixel are inserted (step S204).

When the output value of the adding unit 1202 is smaller than the holding value in the pixel segment insertion unit holding unit 1201, the pixel segment inserting location discriminating unit 1207 outputs the discrimination result 1208 of the level indicating that the pixel is the non-pixel-segment-insertion target pixel. In this case, the pixel clock output unit 201 does not make the control of step S204 but controls so as to output the pixel clock 110 of the period corresponding to the resolution.

The image forming apparatus of the invention continuously executes the processes of steps S201 to S204 mentioned above until the division areas of the photosensitive material 504 are switched. When the processes until a boundary position of the division areas of the photosensitive material 504 are finished, control is made so as to set the magnification count initial value according to the next division area (S205).

In the counting unit 207, if the pixel segment insertion unit holding units 1201 and the area control coefficient holding units 1206 of the number as many as the division areas of the photosensitive material 504 exist, the control by step S201 becomes control for switching to the setting values corresponding to the division area.

As described above, the CPU 100 reads parameters which are necessary for the magnification setting of the PLL 200 before the operation of the image forming apparatus and calculates the proper magnification at which the pixel segment insertion is executed to each input pixel, thereby enabling the high picture quality to be realized. The parameters which are read are the pixel clock frequency of the print unit, the magnification correspondence of the PLL, the pixel segment insertion resolution, and the micro zoom ratio of each division area. The magnification suitable for calculation is set by a form of n/m into the PLL 200 for multiplying the clock 107. A single construction of the clock (clock 107) of the system including the image forming apparatus is realized without constructing the oscillator for generating the pixel clock that is peculiar to the print unit, thereby realizing miniaturization of the apparatus and reduction in costs.

Second Embodiment

The first embodiment has been described mainly with respect to the case where the pixel clock frequency of the print unit of the image forming apparatus is fixed. However, in dependence on the printing apparatus, there is a case where the pixel clock frequency is made variable every operating mode. For example, there is an apparatus having a half-speed mode for conveying the recording control at a half speed of a normal speed. In the print unit having such a mode, a plurality of oscillators have to be constructed as a print unit, so that the system including the image forming apparatus has to have at least three kinds (one kind of system and two kinds of print systems) oscillators.

In the image forming apparatus of the invention, since the control can be performed by the single clock 107 which is formed by the oscillator of the system, the above problem is also solved. However, a case where the pixel clock of the print unit has to be recognized. Therefore, a case of recognizing the pixel clock of the print unit will be described hereinbelow with reference to the drawings.

Figure 18:
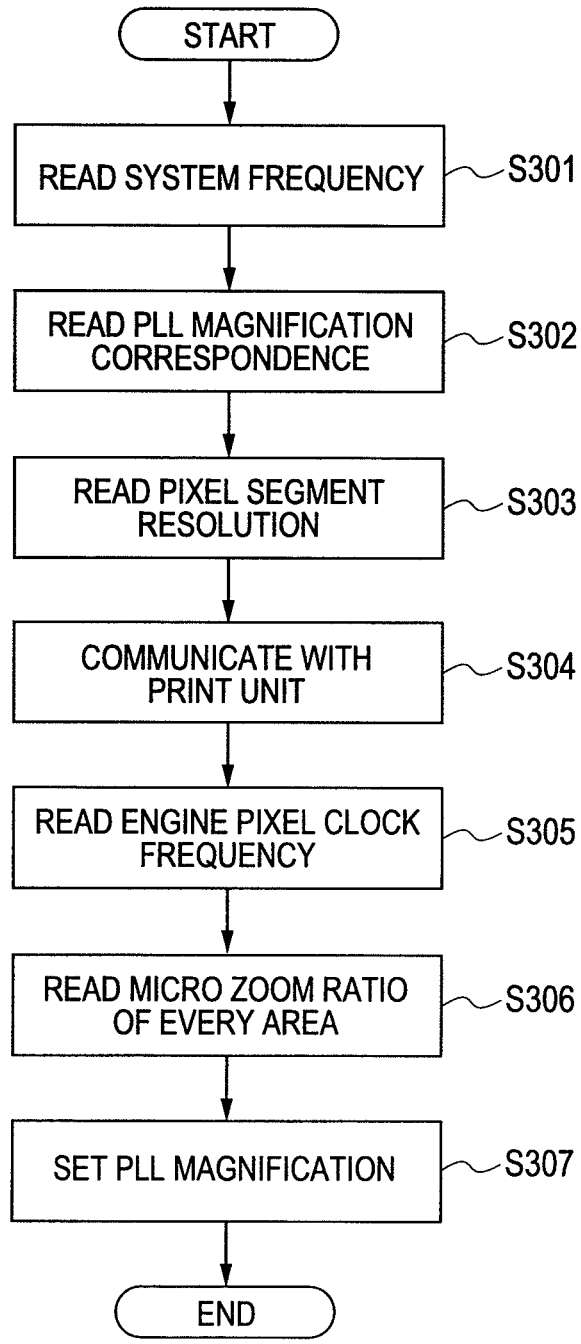
FIG. 18 is a control flow before activation accompanied with communication with the print unit in the invention.

FIG. 18 is a flowchart illustrating the control of the CPU 100 in the case where the pixel clock of the print unit is switched. Prior to activating the image forming apparatus, the CPU 100 reads the frequency of the system clock, the magnification correspondence of the constructed PLL, and the pixel segment insertion resolution (steps S301, S302, and S303). When the reading of the three parameters is finished, the CPU 100 starts communication with the print unit (step S304). The parameters which are recognized by the communication with the print unit are the pixel clock frequency of every operating mode which is desired by the print unit and the zoom ratio of each division area of the photosensitive material 504 (steps S305 and S306). When the pixel clock frequency obtained by the communication with the print unit, that is, the pixel clock frequency of each operating mode which is desired by the print unit is recognized, the CPU 100 calculates the magnification setting of the PLL 200 according to each operating mode and sets it (step S307).

In accordance with the operating mode of the image forming apparatus, the pixel segment insertion unit and the number of insertion pixel segments of every area are set into the relevant holding units on the basis of the high-frequency clock frequency corresponding to the calculation value.

In the invention, the image forming apparatus and a communicating method of the print unit are not particularly limited. That is, command communication by a single wire may be performed or information may be communicated through a common storage medium such as an SRAM or the like. Further, communication may be performed each time the image forming apparatus operates. It is also possible to use such a construction that when a power source of the image forming apparatus is turned on, communication is made and the pixel clock frequency of each operating mode is held into the holding unit in the CPU 100 or into the RAM 102. It is also possible to use such a construction that the magnification setting of the PLL 200 corresponding to the pixel clock frequency of every operating mode obtained by the communication and the parameters regarding the pixel segment insertion are held into the holding unit in the CPU 100 or into the RAM 102.

Also in the second embodiment, since the setting regarding the pixel segment inserting location when the image forming apparatus operates is substantially the same as that in FIG. 17 in the description of the first embodiment, its description is omitted here.

As described above, in the second embodiment, the CPU 100 communicates with the print unit before the image forming apparatus operates, so that the pixel clock frequency of each operating mode can be grasped. By holding or referring to the pixel clock frequency of each operating mode which is obtained by the communication and the parameter regarding the multiplication ratio setting for the PLL 200, the CPU 100 can cope with the pixel clock frequency of each operating mode.

As mentioned above, by using the constructions of the first and second embodiments, in the case where the pixel clock of the print unit of the image forming apparatus is formed from the single and fixed system clock input, the quality of the output image can be improved. As specific control, control is made in such a manner that the multiplication ratio of the PLL is set so as to obtain the high-frequency clock near the magnification according to the resolution to which the print unit corresponds and the micro zoom is executed to each of the pixels constructing the main scanning direction. By this control, the deviation of the micro pixel unit in the main scanning direction is eliminated and the micro deviation in the sub-scanning direction does not occur. Since the pixel clock of the print unit is formed by the single system clock, the clock that is peculiar to the print unit is not constructed. Therefore, an installation area is suppressed and the miniaturization of the apparatus can be accomplished. Since the number of parts can be decreased, the cost reduction can be also realized.

Other Embodiments

The invention is also realized by executing the following processes. That is, software (program) for realizing the functions of the embodiments mentioned above is supplied to a system or apparatus through a network or various kinds of storage media, and a computer (or a CPU, MPU, or the like) of the system or apparatus reads out the program and executes processes based on the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-016293, filed Jan. 28, 2011, which is hereby incorporated by reference herein in its entirety.

What is claimed is:

1. An image forming apparatus comprising:
   a multiplying unit configured to multiply a first clock to drive the image forming apparatus, thereby forming a second clock;
   a first holding unit configured to hold a frequency of a third clock used by a print unit in the image forming apparatus;
   a second holding unit configured to hold a magnification setting of the multiplying unit;
   a third holding unit configured to hold a resolution to which the print unit corresponds;
   a fourth holding unit configured to hold a micro zoom ratio;
   a multiplication ratio control unit configured to set a magnification of the multiplying unit on the basis of the values held in the first to fourth holding units;
   a discriminating unit configured to discriminate whether or not a pixel is a target pixel to which a micro zoom is executed by using the value held in the fourth holding unit;
   a forming unit configured to switch a count comparison value of the second clock formed by the multiplying unit in accordance with a discrimination result of the discriminating unit, thereby forming the third clock; and
   a unit configured to form a pixel segment on the basis of image data of the target pixel corresponding to the discrimination result of the discriminating unit and insert the formed pixel segment in accordance with a period of the third clock.

2. An apparatus according to claim 1, wherein n/m times can be set as a magnification setting into the multiplying unit (n, m being an integer), in the setting of n and/or m, a ratio between a frequency of the second clock and a clock frequency obtained by multiplying the frequency of the third clock by a value corresponding to the resolution held in the third holding unit and a multiplication with the value held in the fourth holding unit are used, and the magnification is set in accordance with a value held in the third holding unit so that the micro zoom is executed to each pixel constructing a main scanning direction of the print unit.

3. An apparatus according to claim 1, wherein n/m times can be set as a magnification setting into the multiplying unit (n, m being an integer), in the setting of n and/or m, a ratio between a frequency of the second clock and a clock frequency obtained by multiplying the frequency of the third clock by a value corresponding to the resolution held in the third holding unit and a multiplication with the value held in the fourth holding unit are used, and the magnification is set in accordance with a value held in the third holding unit so that the micro zoom is executed by a largest amount to pixels constructing a main scanning direction of the print unit.

4. An apparatus according to claim 1, wherein n/m times can be set as a magnification setting into the multiplying unit (n, m being an integer), in the setting of n and/or m, a ratio between a clock frequency obtained by dividing a frequency of the second clock by a value corresponding to the resolution held in the third holding unit and the frequency of the third clock and a multiplication with the value held in the fourth holding unit are used, and the magnification is set in accordance with a value held in the third holding unit so that the micro zoom is executed to each pixel constructing a main scanning direction of the print unit.

5. An apparatus according to claim 1, wherein n/m times can be set as a magnification setting into the multiplying unit (n, m being an integer), in the setting of n and/or m, a ratio between a clock frequency obtained by dividing a frequency of the second clock by a value corresponding to the resolution held in the third holding unit and the frequency of the third clock and a multiplication with the value held in the fourth holding unit are used, and the magnification is set in accordance with a value held in the third holding unit so that the micro zoom is executed by a largest amount to pixels constructing a main scanning direction of the print unit.

6. An apparatus according to claim 1, further comprising a communicating unit configured to communicate, with the print unit, at least one of a pixel clock frequency to which the print unit corresponds and the resolution to which the print unit corresponds, wherein when the construction of the print unit is changed, information held in the first holding unit to the fourth holding unit is changed and the multiplication ratio of the multiplying unit is set, in response to the communication by the communicating unit.

7. An image forming apparatus comprising:
a multiplying unit configured to multiply a first clock to drive the image forming apparatus, thereby forming a second clock;
a first holding unit configured to hold a frequency of a third clock used by a print unit in the image forming apparatus;
a second holding unit configured to hold a magnification setting of the multiplying unit;
a third holding unit configured to hold a resolution to which the print unit corresponds;
a fourth holding unit configured to divide a main scanning direction of a photosensitive material constructing the print unit into a plurality of areas and hold a micro zoom ratio of every division area;
a multiplication ratio control unit configured to set a magnification of the multiplying unit on the basis of the values held in the first to fourth holding units;
a first discriminating unit configured to detect a position in the main scanning direction of image data which is input and discriminate to which one of the division areas the detected position belongs;
a selecting unit configured to select the value held in the fourth holding unit according to a discrimination result by the first discriminating unit;
a second discriminating unit configured to discriminate whether or not a pixel is a target pixel to which a micro zoom is executed by using an output value of the selecting unit;
a forming unit configured to switch a count comparison value of the second clock formed by the multiplying unit in accordance with a discrimination result of the second discriminating unit, thereby forming the third clock; and
a unit configured to form a pixel segment on the basis of image data corresponding to the discrimination result of the second discriminating unit and insert the formed pixel segment in accordance with a period of the third clock.

8. An apparatus according to claim 7, wherein n/m times can be set as a magnification setting into the multiplying unit (n, m being an integer), in the setting of n and/or m, a ratio between a frequency of the second clock and a clock frequency obtained by multiplying the frequency of the third clock by a value corresponding to the resolution held in the third holding unit and a multiplication with the value held in the fourth holding unit are used, and the magnification is set in accordance with a value held in the third holding unit so that the micro zoom is executed to each pixel constructing the main scanning direction of the print unit.

9. An apparatus according to claim 7, wherein n/m times can be set as a magnification setting into the multiplying unit (n, m being an integer), in the setting of n and/or m, a ratio between a frequency of the second clock and a clock frequency obtained by multiplying the frequency of the third clock by a value corresponding to the resolution held in the third holding unit and a multiplication with the value held in the fourth holding unit are used, and the magnification is set in accordance with a value held in the third holding unit so that the micro zoom is executed by a largest amount to pixels constructing the main scanning direction of the print unit.

10. An apparatus according to claim 7, wherein n/m times can be set as a magnification setting into the multiplying unit (n, m being an integer), in the setting of n and/or m, a ratio between a clock frequency obtained by dividing a frequency of the second clock by a value corresponding to the resolution held in the third holding unit and the frequency of the third clock and a multiplication with the value held in the fourth holding unit are used, and the magnification is set in accordance with a value held in the third holding unit so that the micro zoom is executed to each pixel constructing the main scanning direction of the print unit.

11. An apparatus according to claim 7, wherein n/m times can be set as a magnification setting into the multiplying unit (n, m being an integer), in the setting of n and/or m, a ratio between a clock frequency obtained by dividing a frequency of the second clock by a value corresponding to the resolution held in the third holding unit and the frequency of the third clock and a multiplication with the value held in the fourth holding unit are used, and the magnification is set in accordance with a value held in the third holding unit so that the micro zoom is executed by a largest amount to pixels constructing the main scanning direction of the print unit.

12. An apparatus according to claim 7, further comprising a communicating unit configured to communicate, with the print unit, at least one of a pixel clock frequency to which the print unit corresponds and the resolution to which the print unit corresponds, wherein when the construction of the print unit is changed, information held in the first holding unit to the fourth holding unit is changed and the multiplication ratio of the multiplying unit is set, in response to the communication by the communicating unit.

13. An image forming method comprising:
a multiplying step of multiplying a first clock to drive the image forming apparatus, thereby forming a second clock;
a first holding step of holding a frequency of a third clock used by a print unit in the image forming apparatus;
a second holding step of holding a magnification setting of the multiplying step;
a third holding step of holding a resolution to which the print unit corresponds;
a fourth holding step of holding a micro zoom ratio;
a multiplication ratio control step of setting a magnification of the multiplying step on the basis of the values held in the first to fourth holding steps;
a discriminating step of discriminating whether or not a pixel is a target pixel to which a micro zoom is executed by using the value held in the fourth holding step;
a forming step of switching a count comparison value of the second clock formed in the multiplying step in accordance with a discrimination result in the discriminating step, thereby forming the third clock; and
a step of forming a pixel segment on the basis of image data of the target pixel corresponding to the discrimination result in the discriminating step and inserting the formed pixel segment in accordance with a period of the third clock.

14. An image forming method comprising:

a multiplying step of multiplying a first clock to drive the image forming apparatus, thereby forming a second clock;

a first holding step of holding a frequency of a third clock used by a print unit in the image forming apparatus;

a second holding step of holding a magnification setting of the multiplying step;

a third holding step of holding a resolution to which the print unit corresponds;

a fourth holding step of dividing a main scanning direction of a photosensitive material constructing the print unit into a plurality of areas and holding a micro zoom ratio of every division area;

a multiplication ratio control step of setting a magnification of the multiplying step on the basis of the values held in the first to fourth holding steps;

a first discriminating step of detecting a position in the main scanning direction of image data which is input and discriminating to which one of the division areas the detected position belongs;

a selecting step of selecting the value held in the fourth holding unit according to a discrimination result in the first discriminating step;

a second discriminating step of discriminating whether or not a pixel is a target pixel to which a micro zoom is executed by using an output value of the selecting step;

a forming step of switching a count comparison value of the second clock formed in the multiplying step in accordance with a discrimination result in the second discriminating step, thereby forming the third clock; and a step of forming a pixel segment on the basis of image data corresponding to the discrimination result in the second discriminating step and inserting the formed pixel segment in accordance with a period of the third clock.

* * * * *